(12) United States Patent
Fesen (10) Patent No.: US 8,554,787 B2
(45) Date of Patent: *Oct. 8, 2013

(54) SECOND SEARCH ENGINE UTILIZING SELECTED RESULTS FROM FIRST SEARCH ENGINE

(75) Inventor: Brian D. Fesen, Hoboken, NY (US)

(73) Assignee: Clear Channel Management Services, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/559,193

(22) Filed: Jul. 26, 2012

(65) Prior Publication Data

US 2012/0290563 A1 Nov. 15, 2012

Related U.S. Application Data

(63) Continuation of application No. 12/062,295, filed on Apr. 3, 2008, now Pat. No. 8,239,376.

(51) Int. Cl.
*G06F 7/02* (2006.01)
*G06F 17/30* (2006.01)

(52) U.S. Cl.
USPC .................. 707/775; 707/722; 707/769

(58) Field of Classification Search
USPC ............................................ 455/418
See application file for complete search history.

(56) References Cited

U.S. PATENT DOCUMENTS

| 7,865,181 B1 | 1/2011 | Macaluso |
| 8,275,672 B1 * | 9/2012 | Nguyen et al. ............. 705/26.41 |
| 2006/0253436 A1 | 11/2006 | Cook et al. |

* cited by examiner

*Primary Examiner* — Bruce Moser
(74) *Attorney, Agent, or Firm* — Garlick & Markison; Edward J. Marshall (57) ABSTRACT

The invention provides a method of processing data including, receiving a URL at a server computer system, utilizing the URL at the server computer system to extract a plurality of server search results from a data store, and transmitting the server search results from the server computer system to the user computer system.

20 Claims, 10 Drawing Sheets

SECOND SEARCH ENGINE UTILIZING SELECTED RESULTS FROM FIRST SEARCH ENGINE

RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility patent application Ser. No. 12/062,295, entitled "Subsequent Tailoring Of A Sign-Up Page Based On A Search Engine Query," filed Apr. 3, 2008, pending, and scheduled subsequently to be issued as U.S. Pat. No. 8,239,376 on Aug. 7, 2012 (as indicated in an ISSUE NOTIFICATION mailed from the United States Patent and Trademark Office (USPTO) on Jul. 18, 2012)

BACKGROUND OF THE INVENTION

1). Field of the Invention

This invention relates to a computer-based method and system for manipulating electronic media such as ringtones and videos.

2). Discussion of Related Art

Mobile phones usually have a number of ringtones that are installed by a manufacturer. A user can select a ringtone from a drop-down list, and it is also sometimes possible to associate different ringtones with different incoming phone numbers.

A user may wish to download a ringtone from a remote server and store the ringtone in memory of the mobile phone. However, a mobile phone and the network that it is connected to are usually too slow and the viewing capabilities on the mobile phone are too limited for finding media on a remote server. A company that provides mobile media content for use on mobile phones will usually also have a website that is accessible from a user computer system over the internet. The user of the mobile phone may make use of the user computer system to find listings of mobile content on the website through browsing or searching functionality built into the website, and then instruct the website to facilitate downloading of the media content to the mobile phone. A message may, for example, be sent to the mobile phone, and the message can include a link to the media content on the server.

SUMMARY OF THE INVENTION

The invention provides a method of processing data including, receiving a URL at a server computer system, utilizing the URL at the server computer system to extract a plurality of server search results from a data store, and transmitting the server search results from the server computer system to the user computer system.

The method may further include extracting search terms from the URL, and utilizing the search terms to extract the search results.

The search terms may include a plurality of parameters and the server search results match all of the parameters.

The method may further include storing a template at the server computer system, and populating the template with the server search results so that the template, populated with the server search results may be viewable on a display of the user computer system.

One of the server search results may be selectable at the user computer system to transmit an associated file from the server computer system to a mobile device having a designated telephone number.

The method may further include generating the URL at the server computer system, transmitting the URL to a search engine computer system so that when a search request may be transmitted from the user computer system to the search engine computer system the search request may be used to extract a search engine search result with the URL from a search engine database and the search engine computer system transmits the search engine search result and the URL to the user computer system so that the search engine search result may be selectable at the user computer system to cause transmission of the URL from the user computer system to the server computer system.

The invention also provides a computer-readable medium having stored thereon a set of instructions that are executable by at least one processor of a computer system to carry out a method comprising, receiving a URL at a server computer system, utilizing the URL at the server computer system to extract a plurality of server search results from a data store, and transmitting the server search results from the server computer system to the user computer system.

The invention further provides a server computer system comprising, a receiving module for receiving a URL from a user computer system, a data store, a search module connected to the receiving module, the search module utilizing the URL to extract a plurality of server search results from the data store, and a transmitting module connected to the search module, the transmitting module transmitting the search results to the user computer system.

BRIEF DESCRIPTION OF THE DRAWINGS

The invention is further described by way of example with reference to the accompanying drawings, wherein.

DETAILED DESCRIPTION OF THE INVENTION

Figure 1:
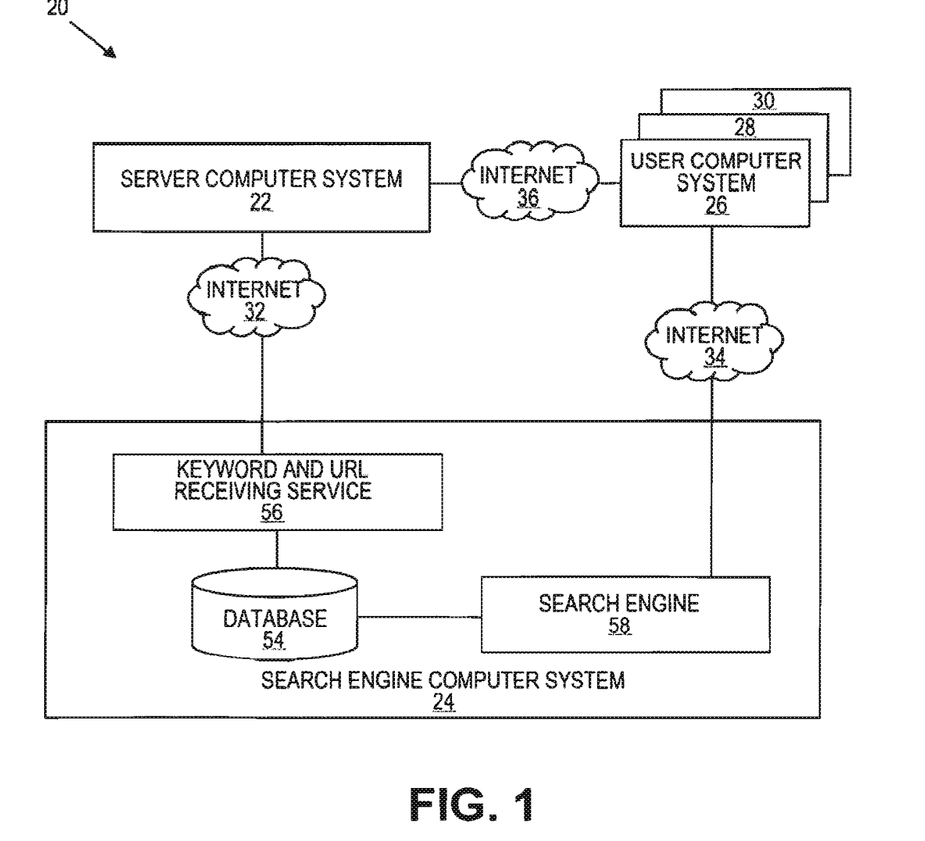
FIG. 1 is a block diagram of components of a network system in which features of the invention are embodied.

FIG. 1 of the accompanying drawings illustrates a network system 20 that embodies features of the invention. The network system 20 includes a server computer system 22, a search engine computer system 24, and a plurality of user computer systems 26, 28 and 30. The search engine computer system 24 is connected to the server computer system 22 over the Internet 32. The user computer systems 26 are connected over the Internet 34 to the search engine computer system 24. The user computer systems 26 are also connected to the server computer system 22 over the Internet 36. The Internet 32, 34, and 36 is shown as separate components for purposes of illustrating flow of data, although it should be understood that the Internet is one integrated network.

Figure 2:
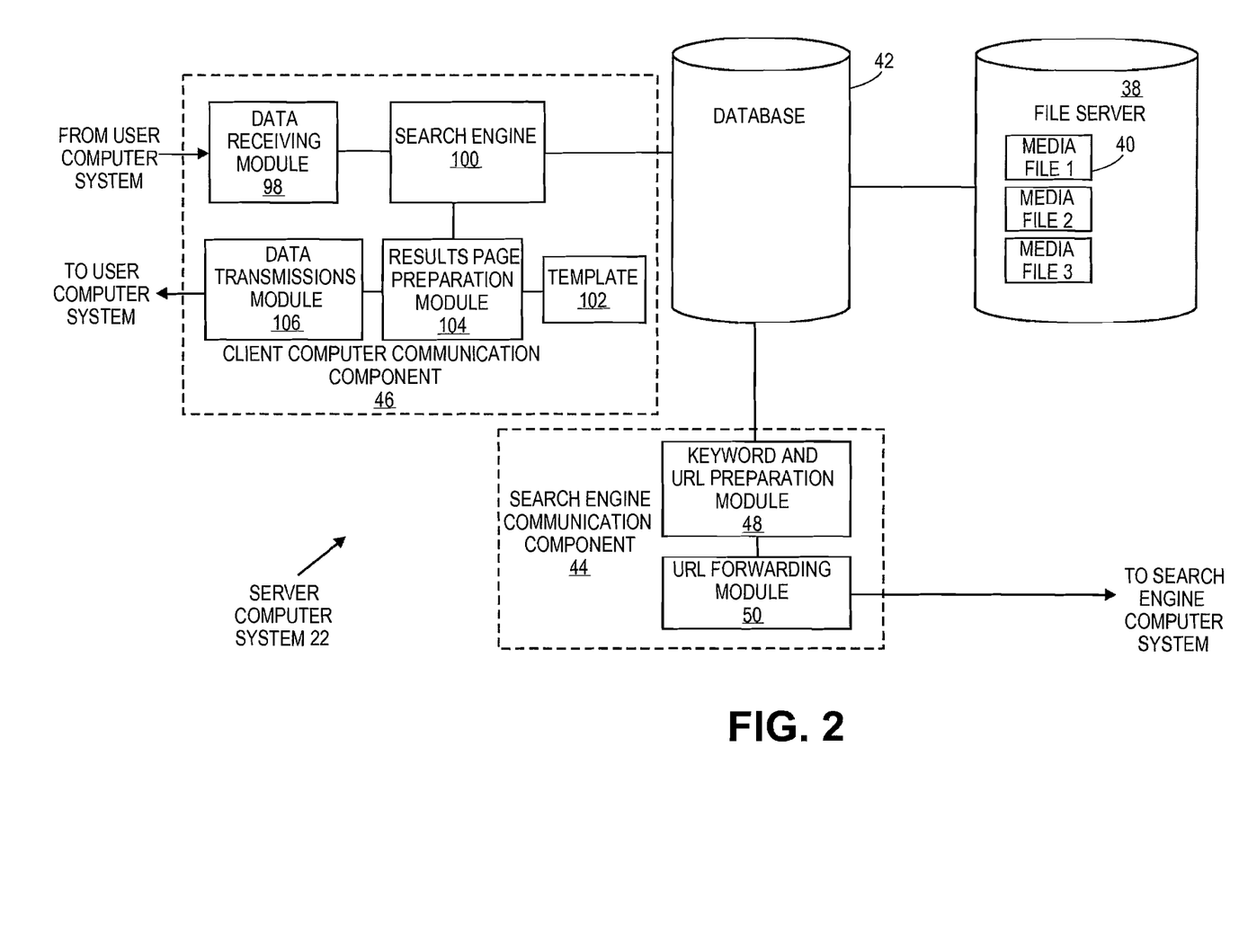
FIG. 2 is a block diagram of a server computer system within the network system of FIG. 1.

FIG. 2 illustrates components of the server computer system 22 in more detail. The server computer system 22 includes a file server 38 that hold a plurality of media files 40, a database 42, a search engine communication component 44, and a client computer communication component 46. The database 42 is connected to the file server 38. The database 42 includes structured data that corresponds to the media files 40 in the file server 38 and is tagged with an artist and an album in the database 42. The media files 40 are typically audio and video files that have been reduced to create ringtones or short video clips. The media file 40 also includes graphics such as album covers or graphics associated with a particular file.

The search engine communication component 44 includes a keyword and uniform resource locator (URL) preparation module 48 and a URL forwarding module 50. The keyword and URL preparation module 48 is connected to the database 42 and creates a URL for each artist reflected in the database 42, together with associated keywords. Artist-specific keywords may be for example "U2 ringtones" and may be associated with a URL "http://offers.thumbplay.com/offers/250/artisttitle2?thpartist=U2." Title-specific keywords may for example be "Beautiful Day, by U2 ringtone" and an associated URL may be "http://offers.thumbplay.com/offers/250/artisttitle2?thpartist=U2&thptitle=beautiful+day."

The keyword and URL preparation module 48 stores the generated URL's and associated keywords in memory. The URL forwarding module 50 is connected to the keyword and URL preparation module 48 and forwards the URL's and associated keywords to the search engine computer system 24 in FIG. 1 as part of a sales transaction that requires payment.

Referring specifically to FIG. 1, the search engine computer system 24 has a database 54, a keyword and URL receiving service 56, and a search engine 58. The keyword and URL receiving service 56 is connected over the Internet 32 to the URL forwarding module 50 in FIG. 2 and is also connected the database 54. The keyword and URL receiving service 56 is responsible for communicating payment information with the server computer system 22 and, following a completed sale, stores the URL's and associated keywords in the database 54.

Figure 3:
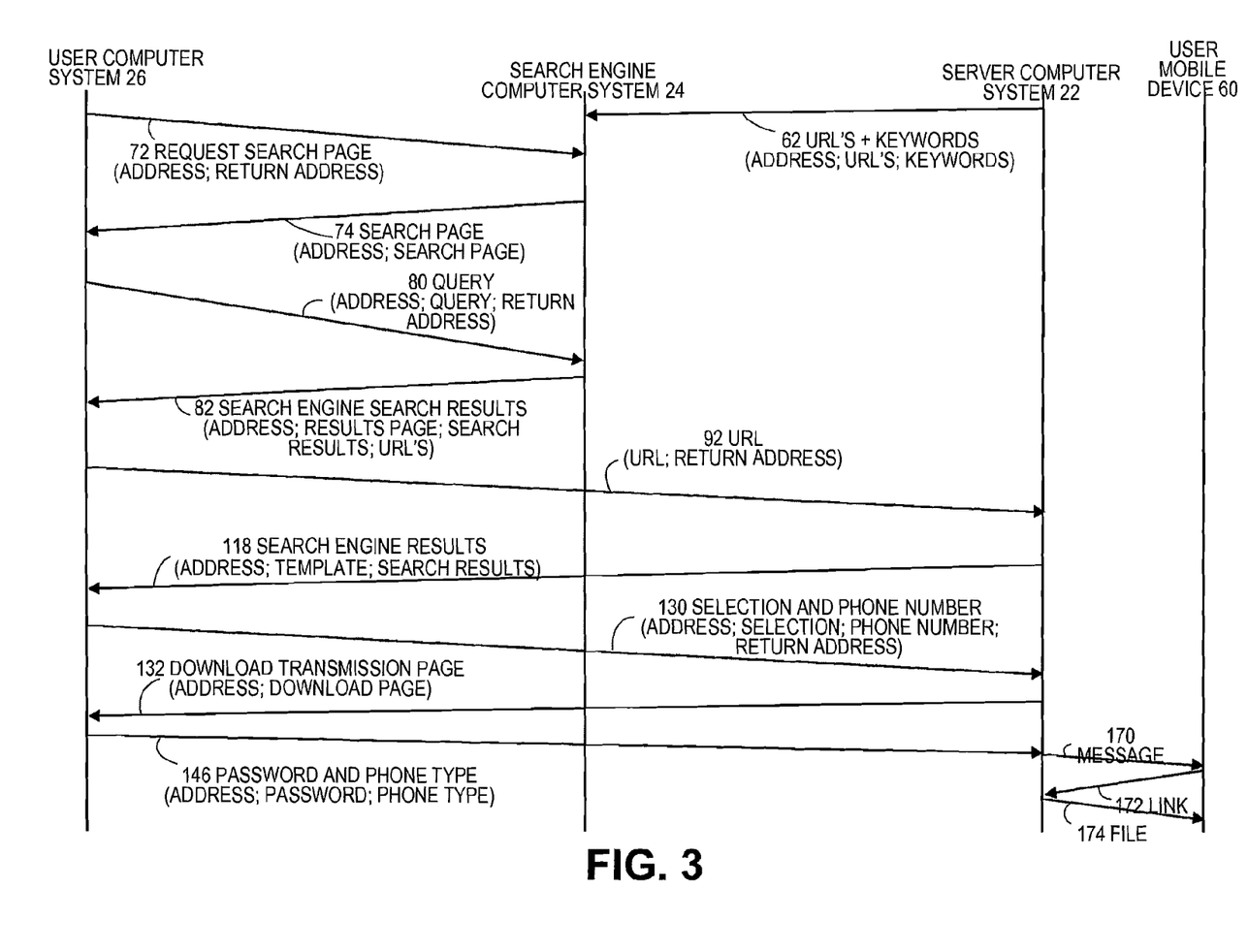
FIG. 3 is an interactive chart showing communication between various computer systems and a mobile device of the network system.

FIG. 3 illustrates the overall data communication according to the embodiment of the invention. The user computer system 26, search engine computer system 24 and server computer system 22 are represented by vertical lines and a further vertical line represents a user mobile device 60. Step 62 represents the transmission of the URL's and associated keywords from the server computer system 22 to the search engine computer system 24. The transmission of the URL's and the keywords may be in the form of a signal that includes an address of the search engine computer system 24, the URL's and the associated keywords. The transmission of the signal from the server computer system 22 results in a corresponding reception of the signal at the search engine computer system 24. Not every transmission and every reception is described herein. One skilled in the art will appreciate that the transmission of the signal will have an associated reception of the signal and will also appreciate what the components of such a signal will entail. Many of the signal components are also listed in FIG. 3.

Figure 4:
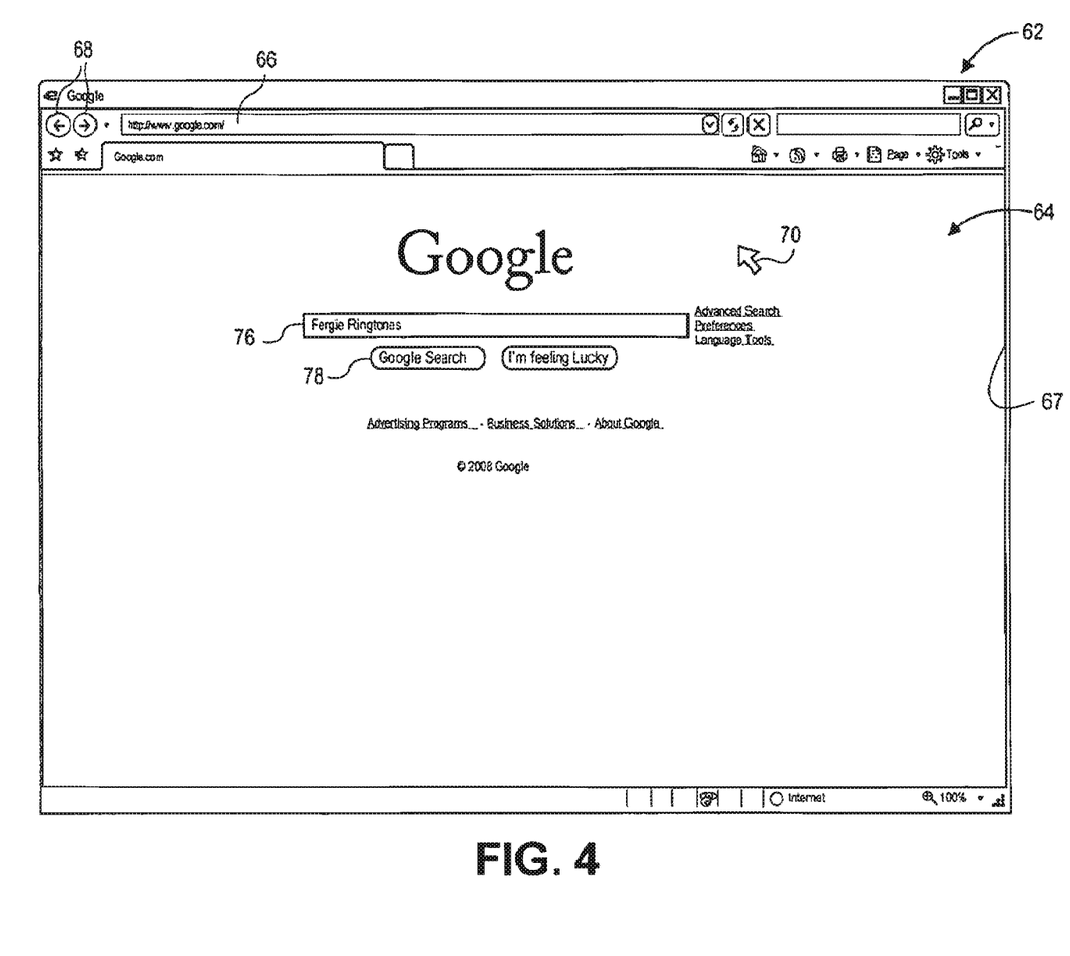
FIG. 4 is a browser view displaying a search page at a user computer system within the network system of FIG. 1.

FIG. 4 illustrates a browser view 62 that displays a search page 64 at the user computer system 26 in FIG. 1. The browser view 62 includes a viewing pane 67 within which the search page 64 is displayed. The browser view 62 also has an address box 66 and back and forward buttons 68. A user can use a mouse to move a cursor 70 into the address box 66, and then depress a button on the mouse to select the address box 66. The user can then utilize a keyboard to enter text such as "http://www.google.com" in the address box 66, and can then depress an "enter" key on the keyboard to transmit a signal and a request for the page. The text within the address box 66 can also be automatically updated, for example, when a user logs into a user-specific page. The back and forward buttons 68 can be selected to view earlier or subsequent pages.

Referring to FIG. 1, the "enter" key that is depressed as described with reference to FIG. 4, causes transmission request for a search page from the user computer system 26 over the Internet 34 to the search engine 56. At Step 74 in FIG. 3, the search engine 58 in FIG. 1 automatically responds to the request 72 by transmitting the search page 64 in FIG. 4 to the user computer system 26. Referring again to FIG. 4, the search page 64 includes a search box 76, and a search button 78. A user can enter a query such as "Fergie ringtones" in the search box 76 and then select the search button 78. As shown in FIG. 3, at Step 80, a query is transmitted from the user computer system 26 to the search engine computer system 24 in response to the selection of the search button 78 in FIG. 4.

The search engine 58 in FIG. 1 utilizes the query to extract data from the database 54. The database 54 may have millions of entries, but only a few entries that have the keywords "Fergie" and "ringtones." The search engine 58 only extracts the queries that are tagged with the keyword "Fergie" and "ringtones." The search engine 58 then prepares a results page with the results that are extracted from the database 54. At Step 82 in FIG. 3, the search engine 58 in FIG. 1 transmits the search results over the Internet 54 to the user computer system 26.

Figure 5:
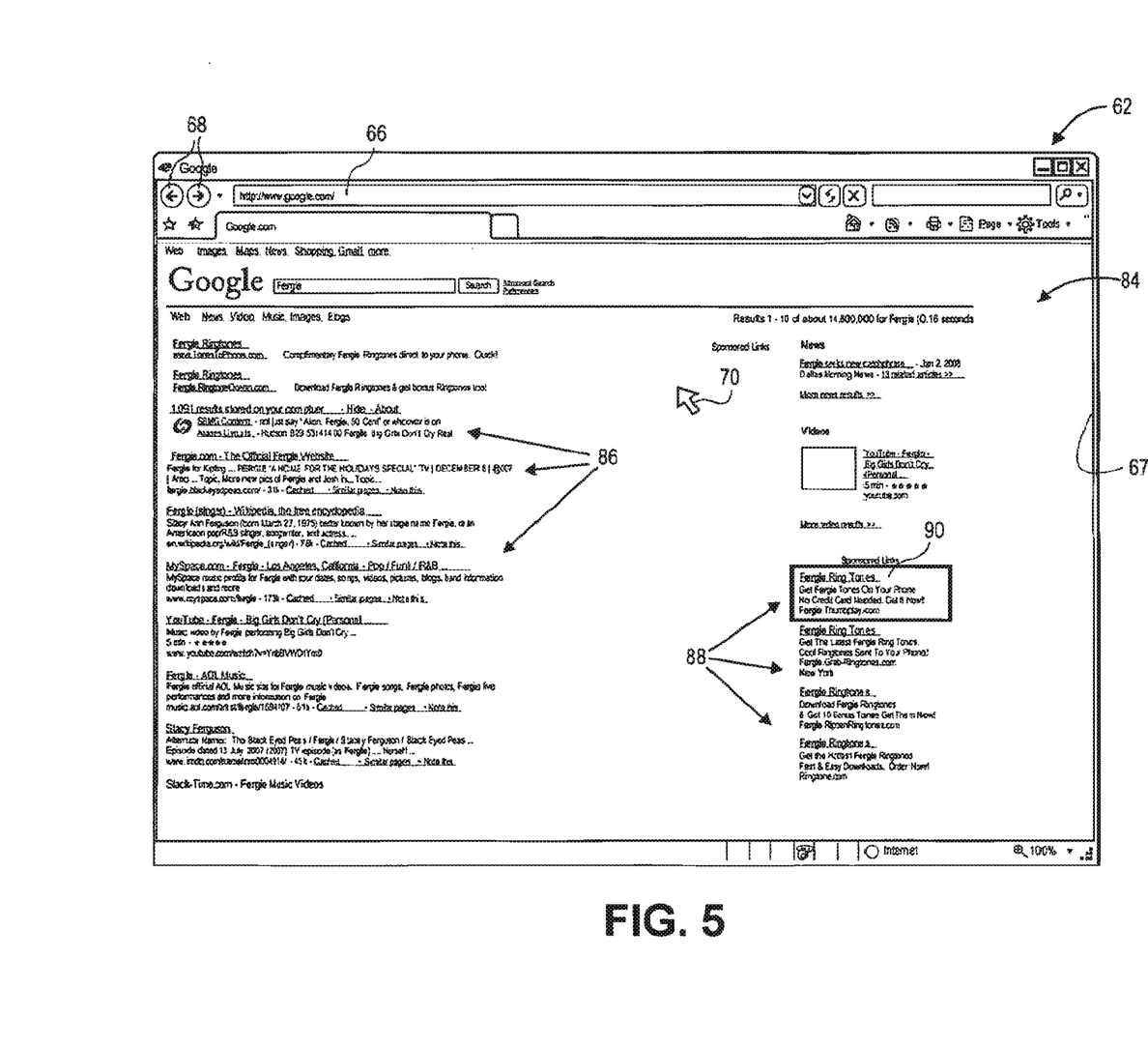
FIG. 5 shows a results page that replaces the search page of FIG. 4.

FIG. 5 shows a results page 84 that is displayed at the user computer system 26 in FIG. 1. The results page 84 includes a plurality of search results 86 that are crawler generated and a plurality of search results that are generated by the keyword and URL receiving service 56 in FIG. 1 from a plurality of server computer systems such as the server computer system 22. The search results 88 include at the top one search result that originated from the server computer system 22 in FIG. 1. The search results 88 include a link 90 with a title and an underlying URL that is not shown. The underlying URL is as follows: "http://offers.thumbplay.com/offers/250/artisttitle2?thartist=Fergie." Selection of the link 90 causes transmission of the URL from the user computer system 26 over the Internet 36 to the server computer system 22 in FIG. 1, as represented by Step 92 in FIG. 3. In another embodiment, selection of the link 90 may cause transmission of a signal from the user computer system 26 over the Internet 34 to the search engine computer system 24, and transmission of the URL from the search engine computer system 24 to the server computer system 22. In either case, the URL reaches the server computer system 22 and sets a search process in motion.

Referring again to FIG. 2, the client computer communication component 46 includes a data receiving module 98, a search engine 100, a template 102, a results page preparation module 104, and a data transmissions module 106. The data receiving module 98 is connected over the Internet 36 in FIG. 1 to the user computer system 26. The search engine 100 is connected to the data receiving module 98 and the database 42. The results page preparation module 104 is connected to the search engine 100 and the template 102. The data transmissions module 106 is connected to the results page preparation module 104 and over the Internet 36 in FIG. 1 to the user computer system 26.

Figure 6:
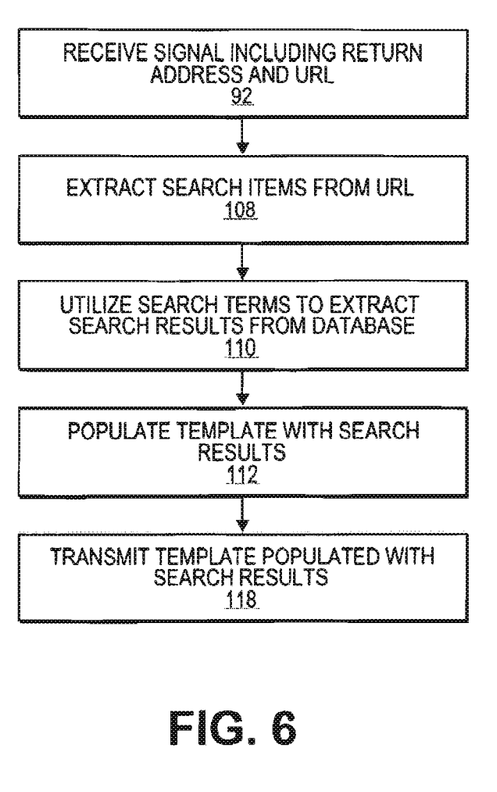
FIG. 6 is a flow chart illustrating a search process that is executed at the server computer system after selection of a search result in FIG. 5.

Referring to FIG. 6, at step 92 (corresponding to Step 92 in FIG. 3) the data receiving module 98 receives the URL from the user computer system 26. At Step 108, the search engine 100 extracts search terms from the URL. In the given example, the search term that is extracted from the URL is "Fergie" for artist. In another example, the search terms that are extracted from the URL may be "U2" for artist and "Beautiful"+"Day" for title. The database 42 has many entries that do not match the extracted terms and a few entries that do match the extracted terms. At Step 110, the search engine 100 utilizes the search term to extract the search results from the database 42 that have the extracted terms. The search engine 100 then forwards the extracted search results to the results page preparation module 104.

Figure 7:
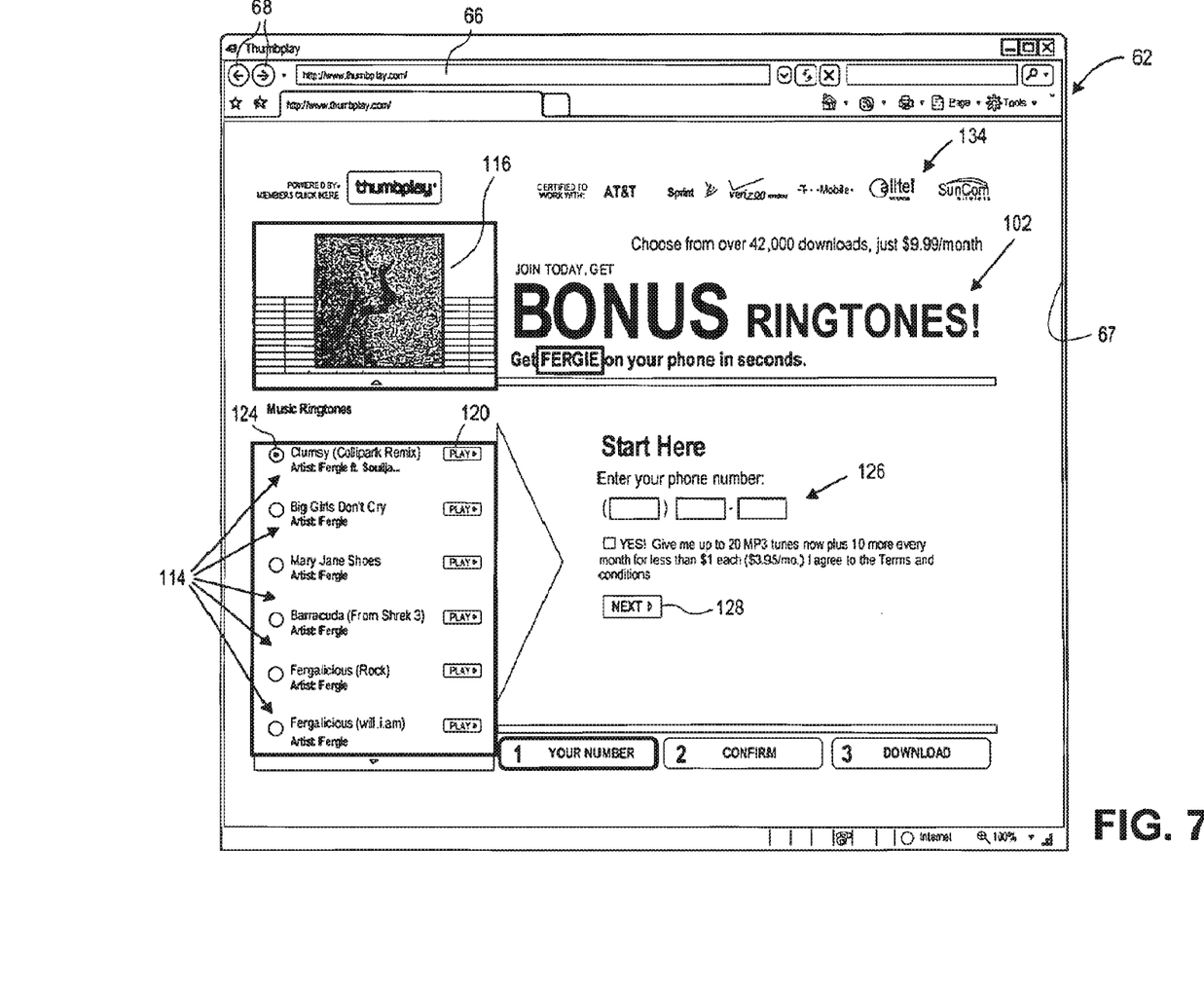
FIG. 7 shows a template that is populated with search results and replaces the results page of FIG. 5.

At Step 112, the results page preparation module 104 accesses the template 102 and populates the template 102 with search results from the search engine 100. FIG. 7 illustrates the template 102 as it is populated with the search results 114 from the search engine 100 in FIG. 2. The database 42 in FIG. 2 also has a plurality of graphics, each one with an associated artist and an associated title. The search engine 100 extracts one graphics 116 and includes the graphics 116 in the template 102. The same template 102 will be used if the extracted terms are different, for example, "U2," but the search results 114 and the graphics 116 will differ.

At Step 118 in FIG. 6, the data transmissions module 106 in FIG. 2 transmits the template 102 in FIG. 7 already populated with the search results 114 and the graphics 116 over the Internet 36 in FIG. 1 to the user computer system 26. Step 118 in FIG. 6 is also represented in Step 118 in FIG. 3. As further shown in FIG. 3, a single signal is transmitted at Step 118, including an address of the user computer system 26, the template 102, and the search results 114 populated on the template 102. It is also possible for the data transmissions module 106 to send the template 102 first, and then send the search results 114 so that the template 102 is populated with the search results 114 at the user computer system 26.

Each one of the search results 114 has a respective "play" button next to, and therefore associated therewith. As mentioned, each one of the search results 114 is associated with a respective one of the media files 40 in the file server 38 of FIG. 2. When a user at the user computer system 26 selects one of the "play" buttons 120, the associated media file 40 is constantly streamed to the user computer system 26. If the media file 40 is an audio file, art audio output is created at the user computer system 26. The audio file plays at a constant speed from a start to an end position.

Each one of the search results 114 has a respective selector 124 next to, and therefore associated therewith. A user can select one of selectors 124. Only one of the selectors 124 can be selected at a particular time; an earlier selection will thus be unselected if the user subsequently makes another selection. The template 102 also has telephone number fields 126, and a "next" button 128. The user can enter a number in the telephone number fields 126, select one of the selectors 124, and then select the "next" button 128. In the present example, the user has selected the selector 124 corresponding to the search result 114 at the top.

Figure 8:
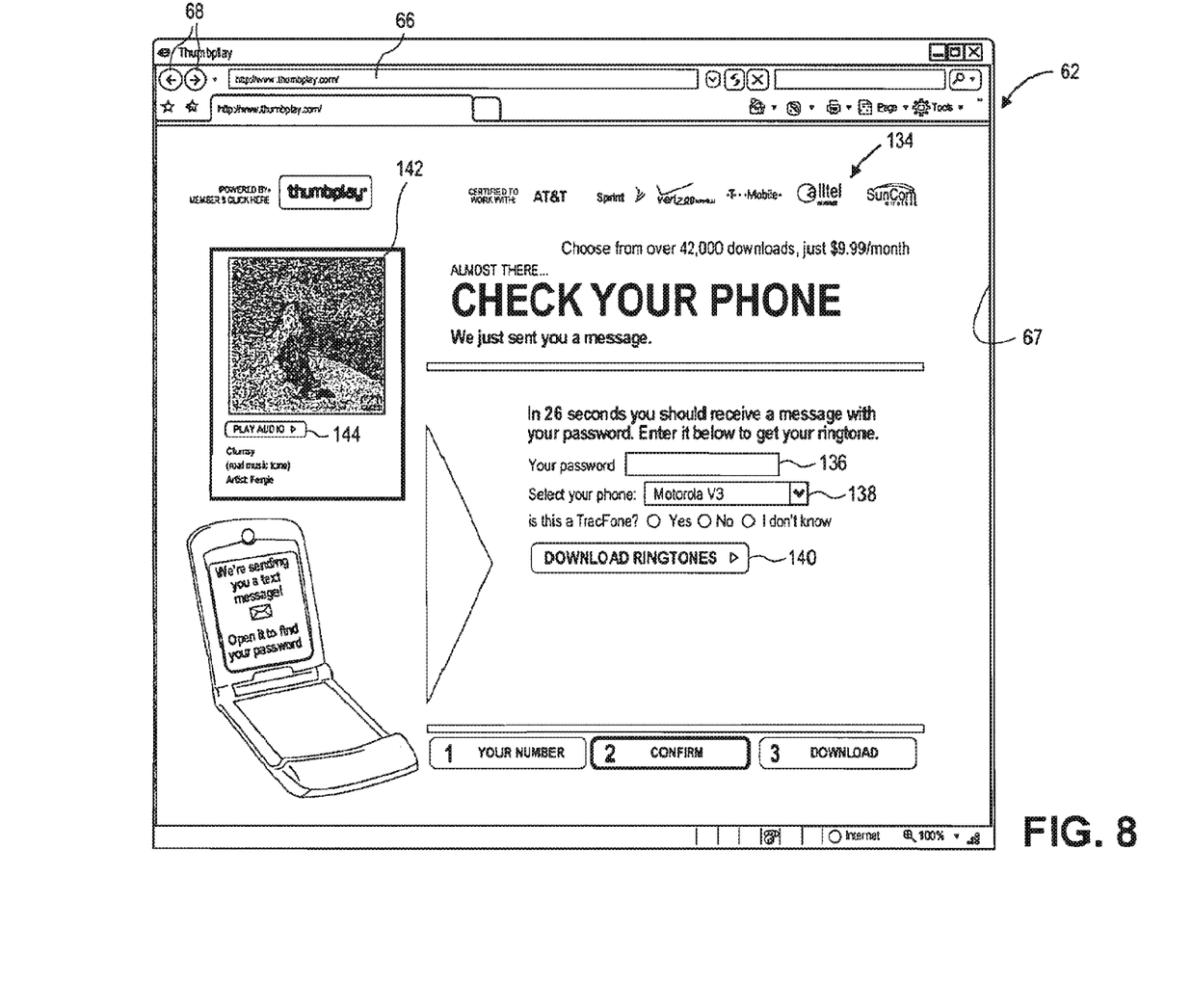
FIG. 8 shows a download page that replaces the template of FIG. 7.

Referring to FIG. 3, Step 130 represents a signal that is transmitted from the user computer system 26 to the server computer system 22 upon selection of the "next" button 128 in FIG. 7. The signal includes the particular selection that the user made in FIG. 7 and also includes the phone number entered by the user. At Step 132, the server computer system 22 transmits a download page 134 as shown in FIG. 8 to the user computer system 26. The download page 134 includes a password field 136, a phone selection field 138, and a "download" button 140. The download page 134 also includes components that are specific to the selection made by the user, including graphics 142 associated with the particular selection and a "play" button 144.

The user can enter a password in the password field 136 and select a particular type of phone in the phone selection field 138. The user can then select the "download" button 140. Referring to FIG. 3, at Step 146, the password and the phone number are transmitted from the user computer system 26 to the server computer system 22.

Figure 9:
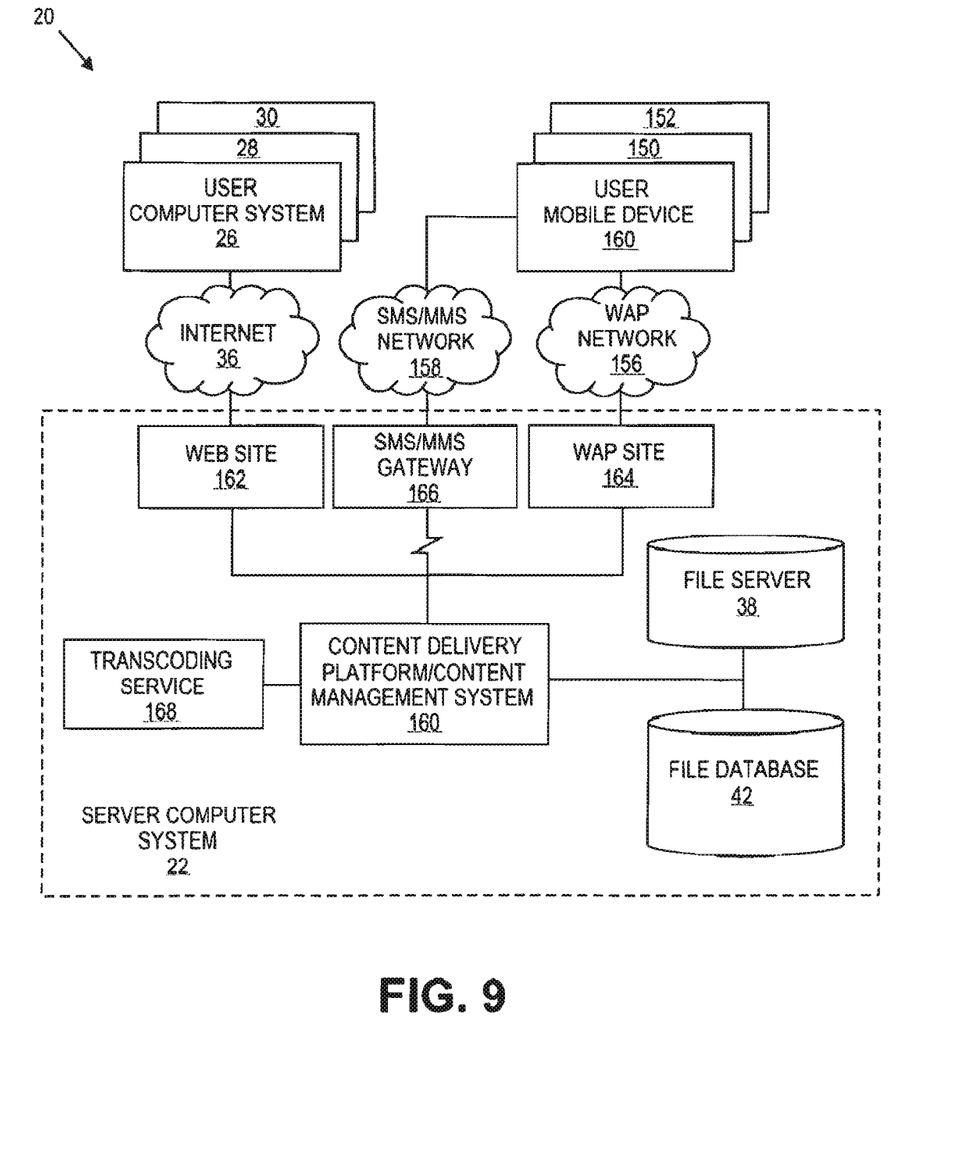
FIG. 9 is a block diagram illustrating further components of the network system of FIG. 1.

FIG. 9 illustrates another part of the network system 20 of FIG. 1, including a plurality of user mobile devices 60, 150 and 152 that are connected over a Wide Application Protocol (WAP) network 156, and a Short Message Service (SMS) and Multimedia Messaging Service (MMS) network 158 to the server computer system 22. The server computer system 22, in addition to the file server 38 and the database 42, includes a content delivery platform and content management system 160, a Web site 162, a WAP site 164, an SMS/MMS gateway 166, and a transcoding service 168. The database 42 is connected to the file server 38. The content delivery platform and content management system 160 forms the center of the server computer system 22 and all other components including the Web site 162, WAP site 164, SMS/MMS gateway 166, transcoding service 168, file server 38 and the database 42 are directly connected to the content delivery platform and content management system 160. The content delivery platform and content management system 160 indexes files from the file server 38 into the database 42 in a structured manner as required for downloading and for the Web site 162, WAY site 164, SMS/MMS gateway 166, and transcoding service 168. For purposes of further discussion it will be assumed that the user mobile device 60 has the phone number entered in the fields 126 of FIG. 7.

Referring again to FIG. 3, the server computer system 22 sends a message 170 to user mobile device 60. The message 170 is in the form of a simple SMS message that is sent over the SMS/MMS network 158 in FIG. 9. The message 170 includes a link 90 that is selectable by a user of the user mobile device 60, typically the same user as the computer system 26. The user can utilize "arrow" and "enter" keys of the mobile device 60 to select the link 90. Upon selection of the link 90, the mobile device 60 transmits a requesting signal that includes the link 90 (172 in FIG. 3) over the WAP network 156 to the content delivery platform and content management system 160. The content delivery platform and content management system 160 then extracts the corresponding media file 40 from the file server 38 (FIGS. 2 and 9) over the WAP network 156 to the user mobile device 60, as represented by Step 174 in FIG. 3. The respective user mobile device 60 then automatically stores a copy of the selected media file 40 in memory.

Figure 10:
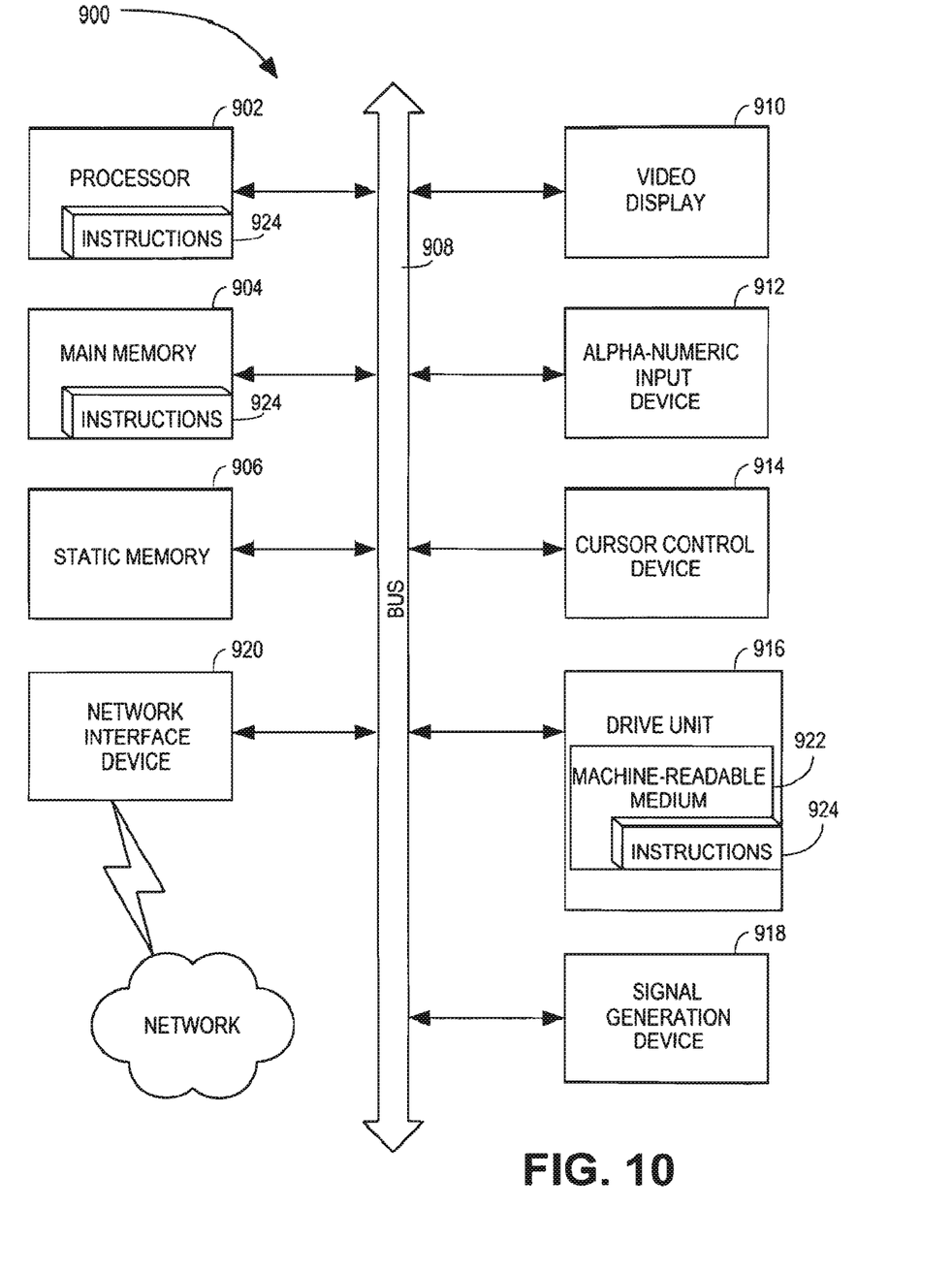
FIG. 10 is a block diagram of a machine in the form of a computer system or a mobile device that may find application within the network system.

FIG. 10 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed is:

1. A method of processing data, comprising:
   transmitting data associated with indexed files stored on a database associated with a server computer system to a first computer system having a first search engine;
   receiving, at the server computer system, a first search results selection from a user computer system, wherein the first search results selection is one of a plurality of possible selections sent from the first search engine, each of the plurality of possible selections associated with at least one indexed file stored on the server computer system;
   utilizing the first search results selection received from the user computer system at a second search engine associated with the server computer system to extract a plurality of second search engine search results from the database associated with the server computer system; and
   transmitting the second search engine search results from the server computer system to the user computer system.

2. The method of claim 1, wherein the selection is a URL associated with at least one indexed file.

3. The method of claim 1, further comprising:
   in response to transmitting the second search engine search results from the server computer system to a user computer system, receiving information relating to a mobile device associated with the user; and
   transmitting an indexed file from the database associated with the server computer system to the mobile device associated with the user.

4. The method of claim 3, wherein the indexed file is transmitted to the mobile device associated with the user via a content delivery platform.

5. The method of claim 3, wherein the indexed file is transmitted to the mobile device associated with the user by one of a WAP network or SMS/MMS network.

6. The method of claim 1, wherein the indexed files stored on the database comprise media files associated with artists, the method further comprising:
   creating a URL for each of the artists having media files stored in the database.

7. The method of claim 6, further comprising:
   associating artist-specific keywords with the URL.

8. A server computer system comprising:
   a search engine communication module configured to transmit data associated with indexed files stored on a database associated with the server computer system to a first computer system having a first search engine;
   a data receiving module configured to receive a first search results selection from a user computer system, wherein the first search results selection is one of a plurality of possible selections sent from the first search engine, each of the plurality of possible selections associated with at least one indexed file stored on the server computer system;
   a second search engine configured to utilize the first search results selection to extract a plurality of second search engine search results from the database; and
   a data transmissions module configured to transmit the second search engine search results from the server computer system to the user computer system.

9. The server computer system of claim 8, wherein the selection is a URL associated with at least one indexed file.

10. The server computer system of claim 8, further comprising:
    the data receiving module configured to receive, in response to transmitting the second search engine search results from the server computer system to a user computer system, information relating to a mobile device associated with the user; and
    the data transmissions module configured to transmit an indexed file from the database associated with the server computer system to the mobile device associated with the user.

11. The server computer system of claim 10, wherein the indexed file is transmitted to the mobile device associated with the user via a content delivery platform.

12. The server computer system of claim 10, wherein the indexed file is transmitted to the mobile device associated with the user by one of a WAP network or SMS/MMS network.

13. The server computer system of claim 8, wherein the indexed files stored in the database comprise media files associated with artists, the server computer system further comprising:
a keyword and URL preparation module configured to create a URL for each of the artists having media files stored in the database.

14. The server computer system of claim 13, wherein the keyword and URL preparation module is further configured to:
associate artist-specific keywords with the URL.

15. A method comprising:
receiving, at a server computer system, a first search results selection from a user computer system, wherein the first search results selection is one of a plurality of possible selections sent from a first search engine, each of the plurality of possible selections associated with at least one indexed file stored on the server computer system;
utilizing a second search engine associated with the server computer system to extract, based on the first search results selection, a plurality of second search engine search results from a database associated with the server computer system; and
transmitting the second search engine search results from the server computer system to the user computer system.

16. The method of claim 15, wherein the selection is a URL associated with at least one indexed file.

17. The method of claim 15, further comprising:
in response to transmitting the second search engine search results from the server computer system to a user computer system, receiving information relating to a mobile device associated with the user; and
transmitting an indexed file from the database associated with the server computer system to the user's mobile device.

18. The method of claim 17, wherein the indexed file is transmitted to the user mobile device via a content delivery platform.

19. The method of claim 17, wherein the indexed file is transmitted to the user's mobile device by one of a W AP network or SMS/MMS network.

20. The method of claim 15, wherein the indexed files stored on the database comprise media files associated with artists, the method further comprising:
creating a URL for each of the artists having media files stored in the database; and
associating artist-specific keywords may with the URL.

* * * * *